United States Patent
Schneider et al.

(10) Patent No.: US 7,328,920 B2
(45) Date of Patent: Feb. 12, 2008

(54) FLEXIBLE CORRUGATED HOSE ASSEMBLY AND CONNECTING PROCESS

(75) Inventors: Axel Schneider, Sinzheim (DE); Andreas Hilgert, Sinzheim (DE)

(73) Assignee: Eaton Fluid Power GmbH, Baden Baden (DE)

( * ) Notice: Subject to any disclaimer, the term of this patent is extended or adjusted under 35 U.S.C. 154(b) by 10 days.

(21) Appl. No.: 10/470,906

(22) PCT Filed: Apr. 14, 2002

(86) PCT No.: PCT/EP02/00285

§ 371 (c)(1), (2), (4) Date: Nov. 18, 2003

(87) PCT Pub. No.: WO02/061324

PCT Pub. Date: Aug. 8, 2002

(65) Prior Publication Data

US 2004/0066037 A1    Apr. 8, 2004

(30) Foreign Application Priority Data

Feb. 1, 2001    (DE) ............... 101 04 448

(51) Int. Cl.
*F16L 33/00*    (2006.01)

(52) U.S. Cl. ............... 285/256; 285/382; 285/903; 29/508

(58) Field of Classification Search ........... 285/256, 285/242, 259, 903, 382; 29/505, 508, 515, 29/516, 521, 890.142
See application file for complete search history.

(56) References Cited

U.S. PATENT DOCUMENTS

| | | | | |
|---|---|---|---|---|
| 2,216,468 A | * | 10/1940 | Farrar | 29/890.14 |
| 2,309,719 A | * | 1/1943 | Vaill | 285/256 |
| 2,556,544 A | * | 6/1951 | Johnson | 285/256 |
| 2,848,254 A | * | 8/1958 | Millar | 285/382 |
| 4,063,757 A | * | 12/1977 | Fuhrmann | 285/222.1 |
| 4,369,992 A | | 1/1983 | Fournier et al. | |
| 4,400,022 A | | 8/1983 | Wright | |

(Continued)

*Primary Examiner*—Aaron Dunwoody
(74) *Attorney, Agent, or Firm*—Benesch, Friedlander, Coplan & Arnoff LLP (57) ABSTRACT

For connecting flexible corrugated hoses, which are not provided with fittings, for transporting preferably gaseous media in connection with high-pressure applications, a holder 3 is provided, which receives an exposed end of the corrugated pipe 6 of the flexible corrugated hose 2 and is pressed together with it to form a metallic seal. The metallic seal is achieved by the surface pressure between the interior wall 18 of an element 16 of the holder and the ribs 8 of the corrugated pipe 6. Elastomeric seals 24, 25, as well as a soldering joint 34, if desired, can be provided as aids. However, in connection with a preferred embodiment the required sealing is already achieved by the strong pressure against each other of the metallic exterior of the corrugated pipe 6 and the metallic interior of the element 16. A further element 17 of the holder 3 fixes a section 28 of the sheathing 11 of the flexible corrugated hose 2 in the axial direction, as well as in respect to tilting movements, so that pivot movements of the flexible corrugated hose 2 do not lead to a relative movement between the corrugated pipe 6 and the holder 3, in particular the element 16. Thus, the sealed area remains unaffected, even in case of mechanical tensile or bending stresses of the flexible corrugated hose assembly 1.

20 Claims, 8 Drawing Sheets

U.S. PATENT DOCUMENTS

| | | | |
|---|---|---|---|
| 4,410,205 A * | 10/1983 | Ingram | 285/256 |
| 4,437,691 A * | 3/1984 | Laney | 285/353 |
| 4,630,850 A * | 12/1986 | Saka | 285/322 |
| 4,805,942 A | 2/1989 | Goodridge | |
| 5,263,747 A * | 11/1993 | Lefebvre et al. | 285/903 |
| 5,413,147 A | 5/1995 | Moreiras et al. | |
| 5,803,511 A * | 9/1998 | Bessette | 285/382 |
| 6,742,815 B2 * | 6/2004 | McCurdy et al. | 285/903 |
| 2004/0094953 A1 * | 5/2004 | Luft et al. | 285/256 |
| 2004/0119283 A1 * | 6/2004 | Furuta | 285/256 |

\* cited by examiner

FLEXIBLE CORRUGATED HOSE ASSEMBLY AND CONNECTING PROCESS

BACKGROUND OF THE INVENTION

The invention relates to a flexible corrugated hose assembly and to a method for connecting a flexible corrugated hose for producing such a flexible corrugated hose assembly.

DESCRIPTION OF THE RELATED ART

So-called flexible corrugated hoses are used as fluid conductors, in particular for the flexible connection of fluid-conducting units. They have an inner corrugated pipe, which defines a fluid channel. The corrugated pipe, most often made of metal, is enclosed in sheathing essentially consisting of plastic, elastomer materials, as well as further components. Often the sheathing is a multi-layered construction. It consists for example of a hose core, which is directly connected with the corrugated pipe. The hose core frequently supports a so-called pressure backing, which is wound from a tension-resistant material in order to assure the pressure resistance of the flexible corrugated hose. In most cases a hose cover is also applied to the pressure backing, which constitutes an exterior protective cover. In the course of producing such flexible corrugated hoses, the individual layers of the sheathing are extruded in sequential work steps onto the prepared corrugated pipes, which have already been provided with connecting nipples at both ends. However, because of this, the lengths of the conductors are already limited to production-generated "fixed lengths".

Therefore the connection of flexible corrugated hoses which have no connecting nipples poses a particular problem. On the other hand there is a strong desire to be able to produce the desired connecting lines at the site, i.e. independently of a preset manufacturing method, by the user from long or endless semi-finished flexible corrugated hose material, without being tied to special deliveries from a manufacturer of flexible corrugated hoses.

The connection of a flexible corrugated hose with a continuing conductor or a fluid-conducting unit must be mechanically solid, must be permanently impervious and it should be possible to produce it in a simple manner. Neither pressure loads nor mechanical stresses, such as are to be expected during the operation of respective installations or units, should or may lead to leakiness, or any other damage of the connection.

Based upon this, a need exists for producing flexible corrugated hose assemblies using non-preproduced flexible corrugated hoses.

SUMMARY OF THE INVENTION

A flexible corrugated hose assembly is provided that includes a flexible corrugated hose and at least one holder which is arranged at an end and is fixedly connected with the flexible corrugated hose. The holder includes a shoulder element, which is connected with a continuing conductor, for example a pipe, or also a fluid channel of a connected unit. To connect the holder with the flexible corrugated hose, a section at the end of the inner corrugated pipe of the flexible corrugated pipe has been exposed and has been pushed into a first pipe-shaped section of the holder. The holder is deformed in such a way that the inner wall of the holder sealingly rests against at least one rib of the corrugated pipe. In this case the inner wall rests on the rib under prestress, so that the rib is solidly pressed against the inner wall. This press fit constitutes a dependable seal, in particular against fluids under high pressure, such as $CO_2$. Such fluids are increasingly employed as refrigerants in refrigerating installations, in particular in the automotive field. Moreover, the solid seating of the corrugated pipe in the first section of the holder causes a mechanical seating of the flexible corrugated hose.

The holder is moreover connected with the sheathing of the flexible corrugated hose, for example by means of a cup-shaped portion, into which the sheathing extends.

Connections of this type can be created at a later time on an end of a flexible corrugated hose in that a portion of the sheathing is removed, and the corrugated pipe end is secured in the holder.

A deformation in the radial direction of the pipe-shaped first section can be performed for creating the fluid-proof press fit of the corrugated pipe in the first section of the holder. The deformation should be performed in a ring-shaped area, which arches over one rib of the corrugated pipe, or several ribs of the same. The deformation can be performed, for example, by means of a pressing device having several radially inwardly moving cheek plates, by the action of which the pipe-shaped section is narrowed in order to clamp the corrugated pipe. The seating and clamping of the corrugated pipe against several ribs results in a particularly mechanical connection and good seating.

Alternatively a magnetic compression can be employed, wherein a magnetic coil, which surrounds the holder concentrically, is charged with a current pulse. If the latter is of sufficient size, it is possible to achieve a compression in the section of interest. Both methods (mechanical deformation, magnetic deformation) lead to a plastic deformation of the first section of the holder.

It is moreover possible to cause the press fit between the holder and the corrugated pipe by means of a shrinking process. In this case a holder with memory properties (metal with a shape memory) can be employed. Further than that it is possible to utilize a thermal shrink seating, for example in that the first section of the holder has a reduced size in respect to the corrugated pipe. If then the corrugated pipe is cooled by means of liquid nitrogen, for example, and in a countermove the holder is heated to 200° or 300°, for example, the corrugated pipe end can be introduced into the holder. Following the equalization of the temperature difference, the holder section has contracted and the corrugated pipe has again expanded, by means of which a radial pressing force is created between the wall of the first section of the holder and the corrugated pipe.

It is furthermore possible to achieve a solid seat of the end area of the corrugated pipe in the first section of the holder in that the corrugated pipe is axially compressed. For this purpose the end of the corrugated pipe relieved of sheathing is inserted into the holder section and is axially compressed there in such a way that the ribs being upset slightly give way radially to the outside, so that a pressing together with the wall of the holder section is created.

Several of the represented steps can be combined with each other if this is desired, in order to achieve a solid pressed connection.

It has been shown that a metallic seal between the corrugated pipe and the holder element achieved in the mentioned way, or in another way, is diffusion-tight, particularly at high pressures, and results in a better seal than a seal by means of elastomeric seals. In addition, the seal can be aided and even further improved by a welded connection. For this purpose, the holding element is initially pressed together with the corrugated pipe, and thereafter heating of the pressed connection is performed. The heating can be achieved, for example, by means of an induction heating process. A welded connection can be created by means of the mutual action of pressure force at the contact surface between the rib of the corrugated pipe and the interior wall and the briefly effective high temperature (below the melting temperature of the metal involved).

In addition, an elastomeric sealing element, for example an O-ring or the like, can be used for sealing the corrugated pipe against the first section of the holder. For example, such an O-ring can be inserted between two ribs of the corrugated pipe into the gap provided there. If needed, a plurality of such O-rings or other sealing elements can be provided.

The connection of the first section of the holder to a further fluid channel can take place, for example, by way of a soldered or welded connection, in that an appropriate conduction piece is inserted into the section and is soldered together with it. This conduction means can additionally be soldered or welded together with the corrugated pipe. A soldered connection with the front end of the corrugated pipe is preferred.

The second section of the holder can be in an interlocking connection with the sheathing of the flexible corrugated hose. For this purpose, the second section can be compressed radially inward, for example by pressing in a narrow or wider ring-shaped area. If the pressing is performed in a narrow ring-shaped area, the latter is preferably arranged between two ribs of the corrugated pipe in order to reduce or prevent a deformation of the corrugated pipe.

If required, the second section of the holder can be profiled on the inside. Ribs, or also a threaded portion, can be provided on its wall for this purpose. A particularly solid connection between the holder and the sheathing is achieved during the pressing because of this.

Advantageous details of embodiments of the invention ensue from the following description of the drawing figures, the drawings, or from the dependent claims.

BRIEF DESCRIPTION OF THE DRAWINGS

Exemplary embodiments of the invention are illustrated in the drawings, of which the following is a brief description.

DETAILED DESCRIPTION OF THE INVENTION

Figure 1:
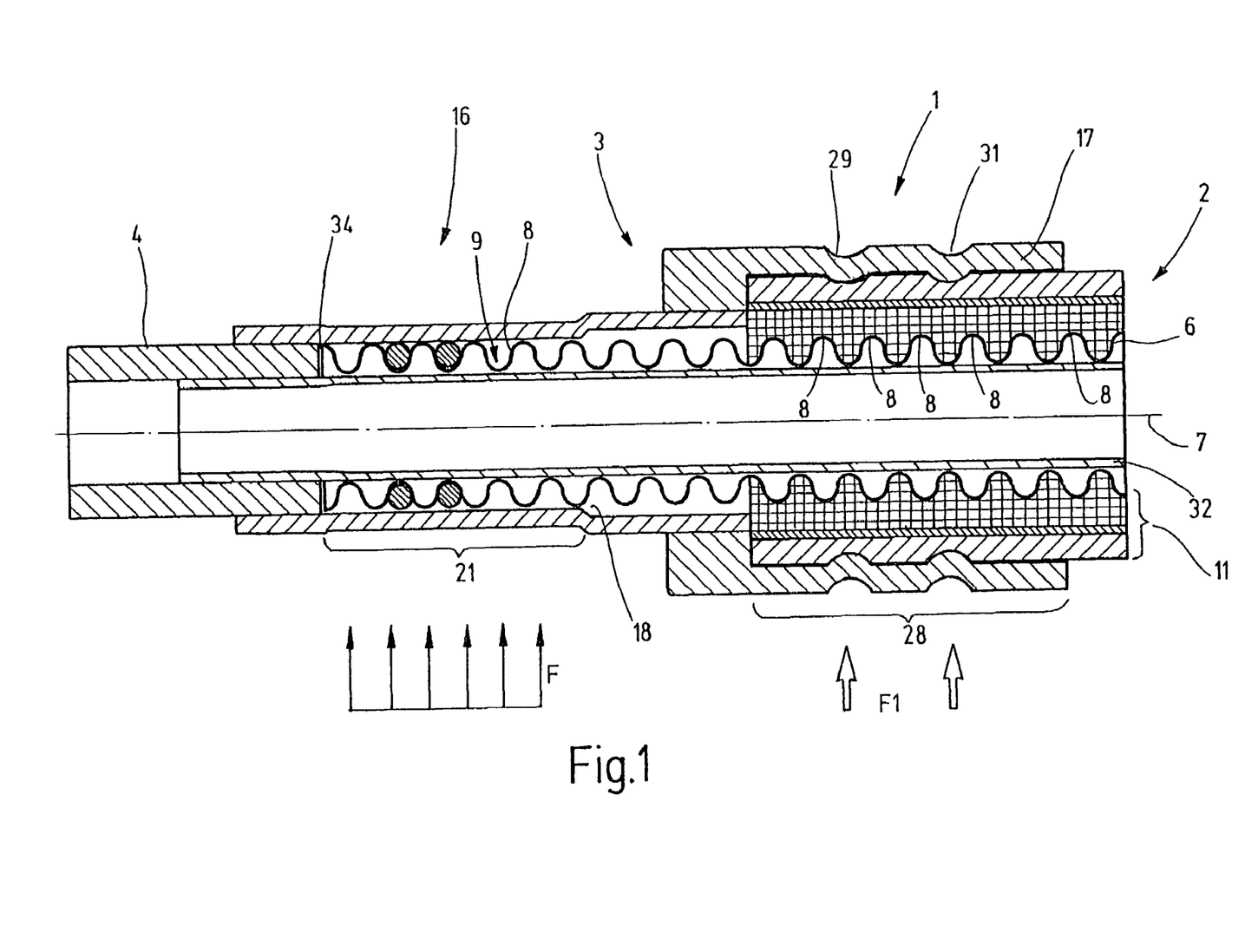
FIG. 1, a flexible corrugated hose assembly in a partial longitudinal section.

A flexible corrugated hose assembly 1 is partially shown in FIG. 1. The flexible corrugated hose assembly 1 contains a flexible corrugated hose 2, which constitutes a flexible fluid conductor. The flexible corrugated hose 2 is connected via a holder 3 to a pipe element 4 or other conducting means. Another connecting piece, which constitutes a continuing conductor, or is an element of a connected unit, such as a unit which is a part of a refrigerating installation, can also be provided in place of the pipe element 4. Flexible corrugated hose assemblies of the type illustrated in FIG. 1 are suitable for use in refrigerating installations for motor vehicles for the flexible and vibration-resistant fluid connection between individual units or components of the refrigerating installation. In particular, the flexible corrugated hose assembly 1 is suitable for connecting chambers containing fluids which are under a high interior pressure of up to several hundred bar.

The flexible corrugated hose 2 contains a corrugated pipe 6. The latter has a circular cross section, wherein the diameter of the corrugated pipe increases and decreases in a wave shape along its axis 7. The corrugated pipe 6 is a thin-walled metal pipe. Because of the wave-shaped diameter changes, it has ring-shaped ribs 8, which are spaced apart from each other and between each of which gaps 9 are provided.

Figure 4:
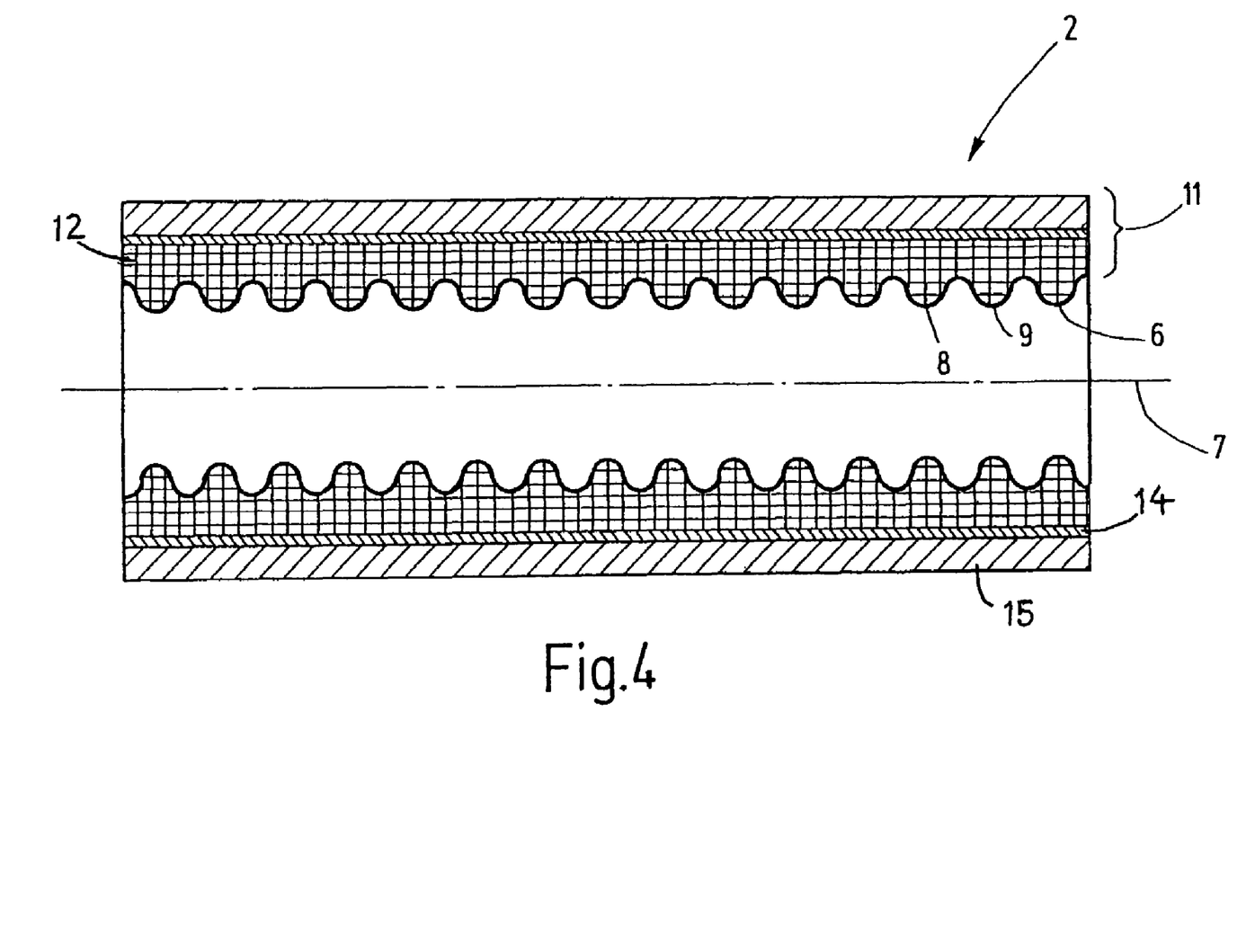
Figure 5:
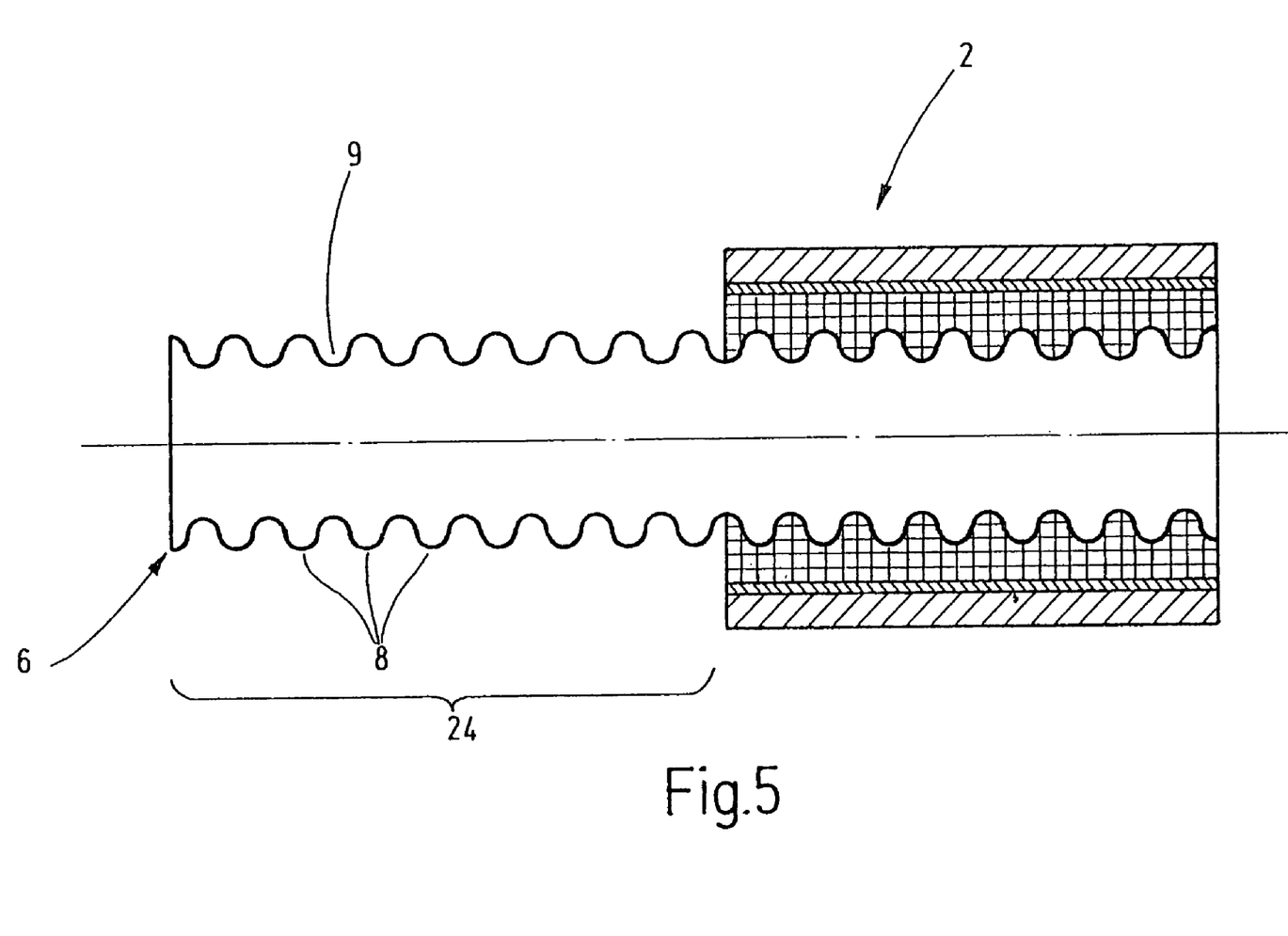

The flexible corrugated hose 2 is separately illustrated in FIG. 4. As can be seen, that the corrugated pipe 6 has a sheathing 11, which consists of a hose core 12, a pressure backing 14, which is arranged concentrically in respect to the corrugated pipe 6 on the hose core 12, and an exterior cover 15. The hose core 12 is for example an elastomer body, which is connected with the corrugated pipe 6 by its material being incorporated in it and which sits on the ribs 8 and fills the gaps 9 between the ribs 8. Its cylindrical exterior surface is enclosed by the pressure backing 14, which can be constituted, for example, by a woven hose, crossing textile threads or wires or a similar tensionally rigid structure. The exterior cover 15 is again an elastomeric material or a plastic material, which is used for the exterior protection of the flexible corrugated hose 2.

Figure 2:
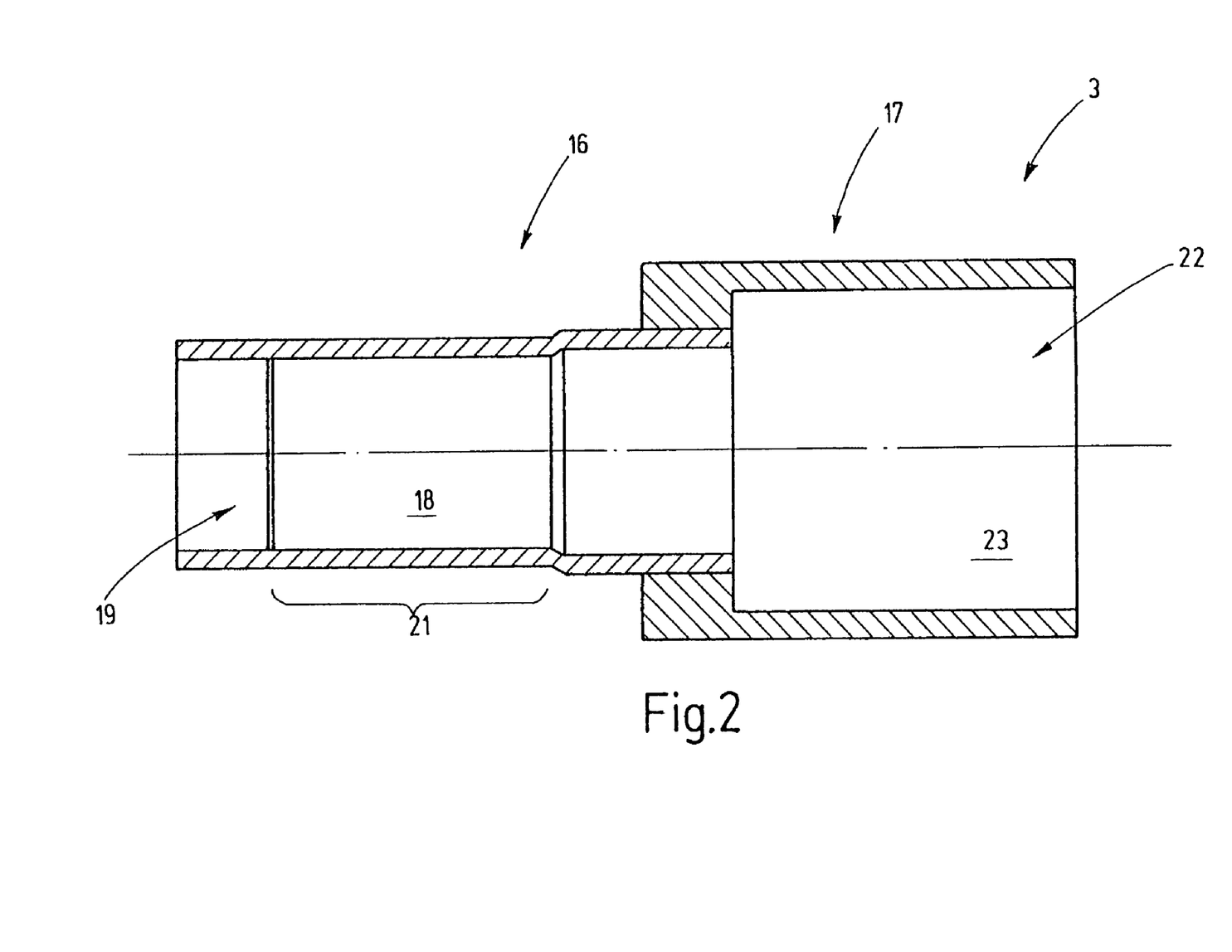
FIG. 2, a holder for connecting a flexible corrugated hose.

The holder 3, separately illustrated in FIG. 2, is used for connecting the flexible corrugated hose 2. The holder 3 has a first, pipe-shaped element 16 and a second, cup-shaped element 17. The first element 16 defines a passage 19 with its interior wall 18. It is approximately cylindrical—at least it does have a cylindrical section 21, whose diameter is slightly larger than the exterior diameter of the corrugated pipe 6.

The first element 16 extends into an opening at the bottom of the second element 17 and is connected there, for example welded or soldered, with the bottom of the cup-shaped embodied second element 17. It is also possible for both elements 16, 17 to be connected in one piece with each other. Starting at the passage 19 terminating in the cup, a continuing opening 22 extends through the element 17, so that the holder 3 is open at both ends. The wall 23 of the second element which defines the opening is embodied to be cylindrically smooth, for example.

Figure 3:
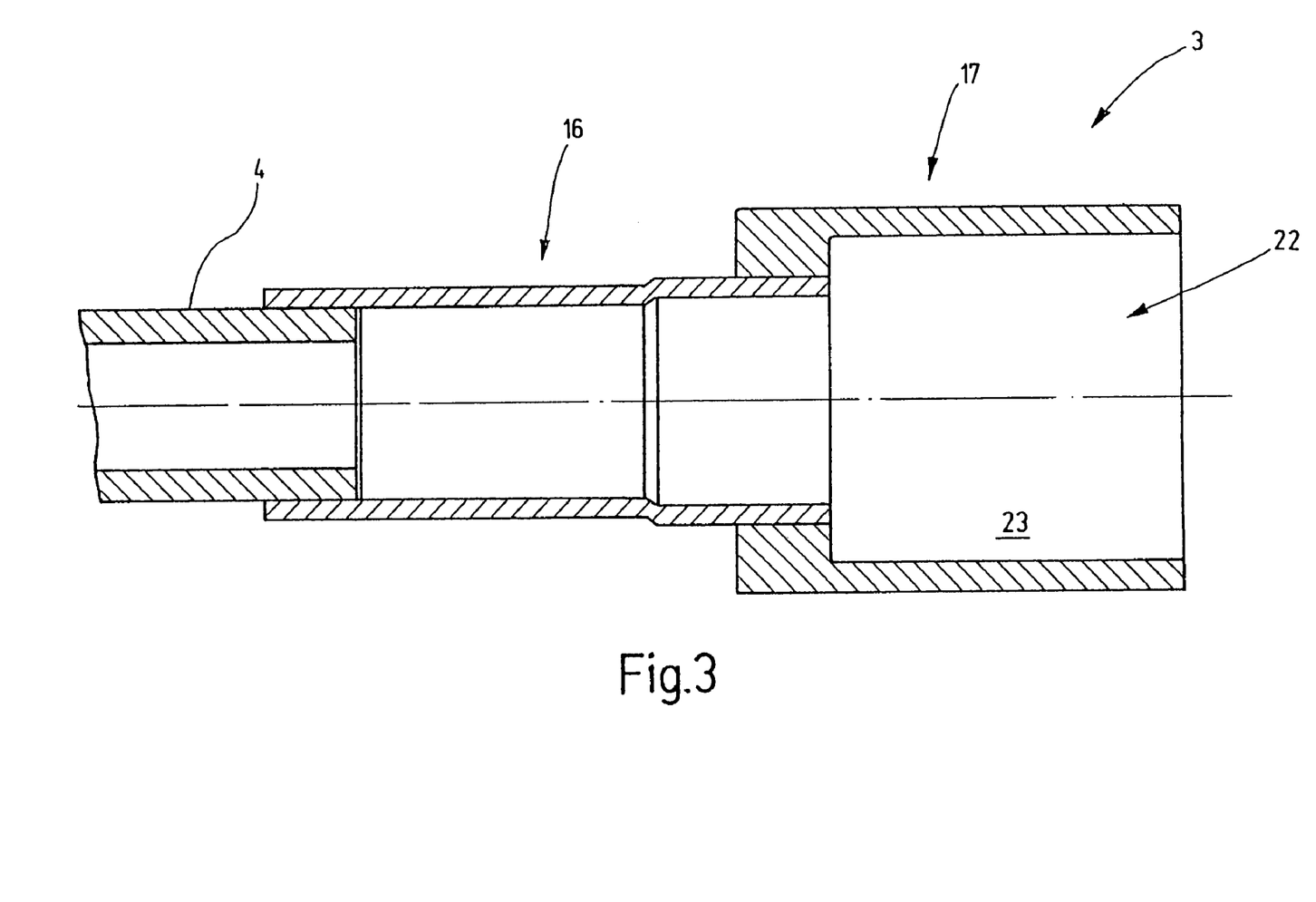
FIG. 3, the holder in FIG. 2, connected to a further conducting means, in a longitudinal sectional view, FIG. 4, a flexible corrugated hose in a partial longitudinal section, FIG. 5, the flexible corrugated hose in FIG. 4 with the sheathing removed in the end area, in a longitudinal sectional view, FIG. 6, the flexible corrugated hose in FIG. 5, provided with two O-rings, in a longitudinal sectional view, FIG. 7, the flexible corrugated hose assembly prior to being pressed, in a longitudinal sectional view, and FIG. 8, a changed embodiment of a flexible corrugated hose assembly in the pressed state and in a longitudinal sectional view.

As illustrated in FIG. 3, to start with, the holder 3 can be formed from the elements 16, 17 in that the element 16 is inserted into the element 17 and connected with it. Moreover, the pipe element 4 can be fitted into the open end of the element 17 and connected with it. The connection can be a soldered connection. As required, other connecting techniques can also be employed.

Figure 6:
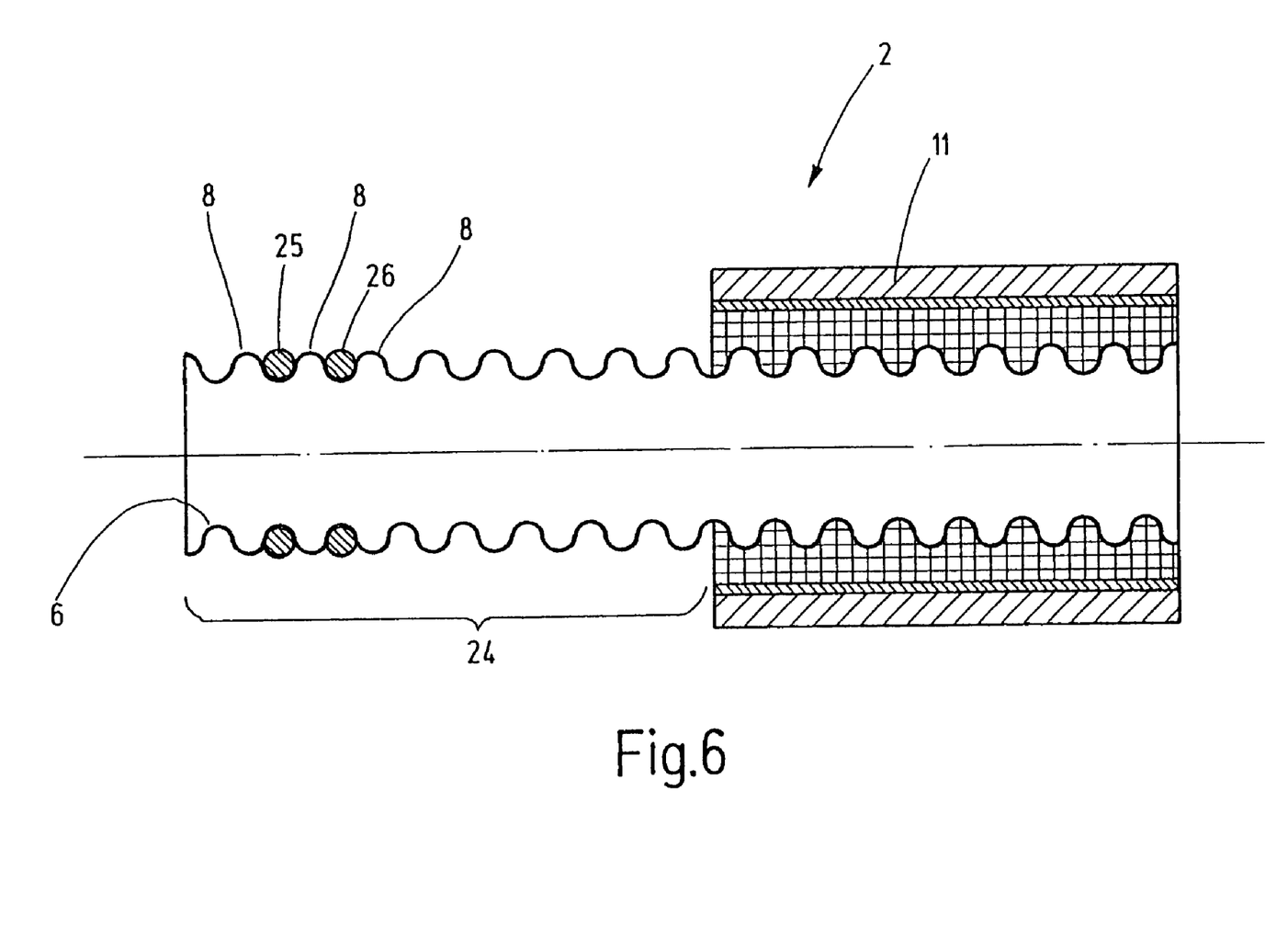

The flexible corrugated hose assembly 1 illustrated in FIG. 1 is produced in the following manner:

First, a piece of a flexible corrugated hose 2 of the desired length is cut off from a suitable raw material. The sheathing 11 of the flexible corrugated hose 2 which is partially shown in FIG. 4 is removed from the corrugated pipe 6 in an end area 24. The corrugated pipe 6 is thereby exposed in the end area 24. At least some of the ribs 8 in the end area 14 are then cleaned, for example by means of rotating wire brushes, so that they have a metallic clean surface at the exterior circumference of the ribs 8. In addition, the elastomer remnants of the hose core 12 are removed from the gaps 9, but at least one gap 9, in order to form a seat for the sealing elements, for example O-rings 25, 26. This is illustrated in FIG. 6. The O-rings 25, 26 are arranged near the free end of the corrugated pipe 6 in two gaps between respectively two ribs 8. In respect to their cord diameter, the O-rings 25, 26 are of such a size that they have the same exterior diameter as the ribs 8, or slightly project radially toward the exterior past the ribs 8. The transition between the exposed end area 24 of the corrugated pipe and the untouched sheathing 11 is formed by an annular shoulder 27, whose shape is matched to the shape of the bottom of the cup-shaped element 17 (FIG. 1). In the instant case the annular shoulder 27 is formed by an essentially flat annular front face of the sheathing 11.

Figure 7:
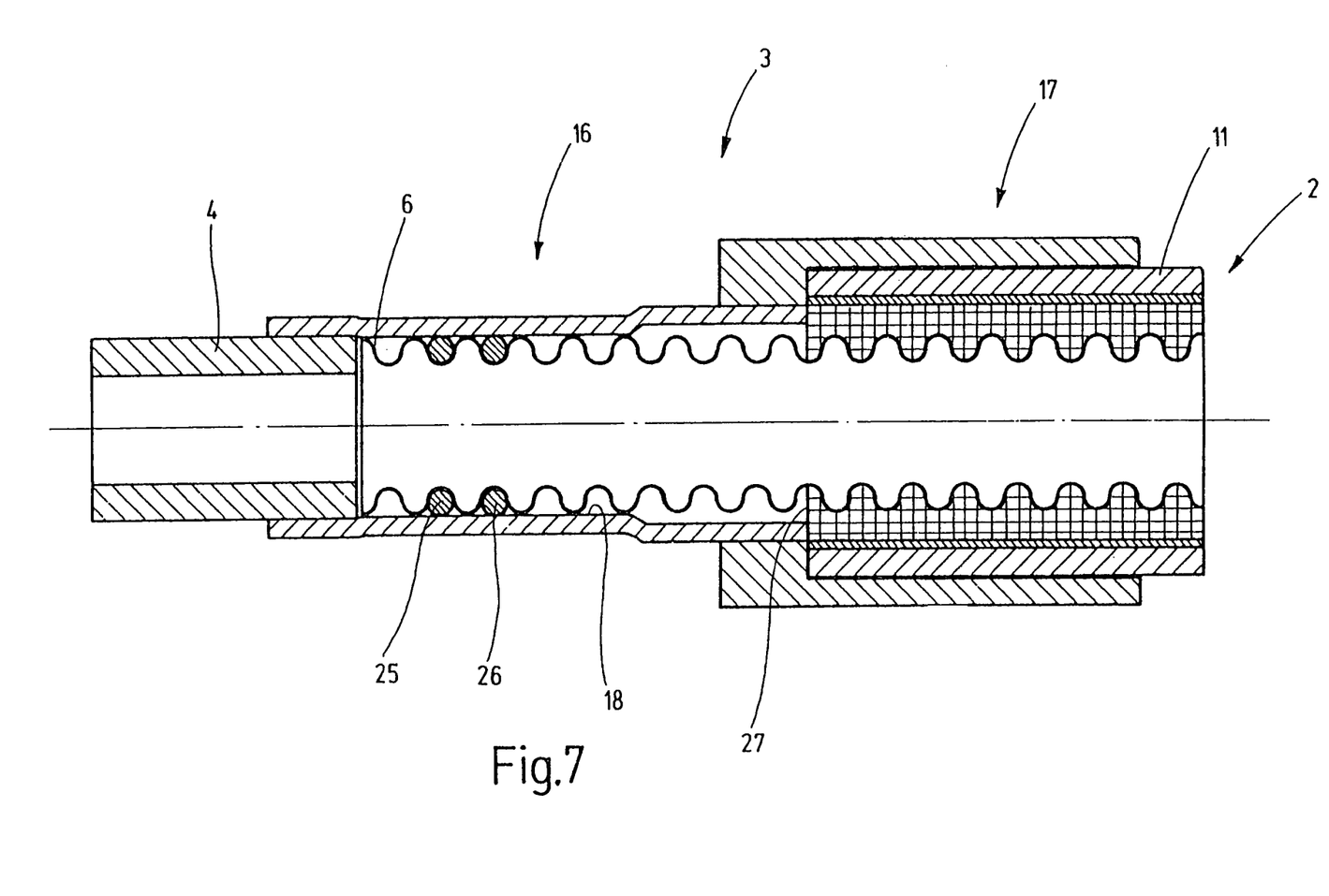

As can be seen in FIG. 6, for the continued assembly of the holder 3, the prepared end of the flexible corrugated hose 2 is pushed into the holder in accordance with FIG. 3 until the front end of the corrugated pipe 6 comes to rest against the pipe element 4, and the annular shoulder 27 at the bottom of the element 7. This state is illustrated in FIG. 7. If required, a ring made of solder can be inserted between the corrugated pipe 6 and front end of the pipe element 4. The ribs 8 of the corrugated pipe 6 are seated with slight play in the first element 16 of the holder. The sheathing 11 of the flexible corrugated hose 2 is seated, also with slight play, in the element 17 of the holder 3. Preferably, the O-rings 25, 26 are already in contact with the wall 18 of the element 16.

Next, a soldering process is now performed in which the end of the corrugated pipe 6 is soldered to the pipe element 4, or the element 16, at a soldering joint 34. If a solder ring had been previously inserted, this takes place merely by heating the respective area of the holder 3. If required, the soldered connection between the elements 16 and 17 can be made in this process step, unless this had been done earlier already. However, if no soldered connection between the end of the corrugated pipe 6 and the holder 3, or respectively the pipe element 4, is desired, the soldering step can be omitted.

To produce the metallic seal of the fluid channel, i.e. in the end that of the corrugated pipe 6 against the pipe element 4, the holder 3 is now changed to the shape illustrated in FIG. 1. For this purpose, each one of the two holder elements (element 16, element 17) are charged with an inwardly directed force in an annular area. In FIG. 1, this is represented for the section 21 by the force application F. The latter is applied, for example, by means of several radially inwardly moved cheek plates, to the exterior circumference of the element 16. In this case the direction of the force is pointed essentially radially inward at all locations of the circumference of the element 16, so that the element 16 is plastically deformed. As a result, the free interior diameter of the passage 19 in the section 21 is reduced.

During the same step, or in a further pressing step, the element 17, which receives a section 28 of the sheathing, is charged with an inwardly directed force F1 in one or several areas along the entire circumference of the annular area. As a result, ring-shaped, radially inwardly deformed compressed areas 29, 31 are created, which axially match the gaps 9 between ribs 8 and clamp the sheathing 11 in a frictionally and interlockingly connected manner. The sheathing 11 of the flexible corrugated hose is held axially fixed in the holder 3. But sealing is achieved by the metallic press fit between the interior wall 18 and the exterior circumferential areas of the ribs 8 in the section 21.

As illustrated in FIG. 1, a hose or flexible pipe 32 can be inserted into the corrugated pipe 6, which projects without play into the pipe element 4 and covers the ribs 8 toward the fluid channel. This is in particular possible because the holder 3 connects the flexible corrugated hose without reducing its interior diameter at any place. The pipe 32 can be used for reducing the noise generated by a fluid flow, as well as for reducing the flow-through resistance. However, if desired, it can also be omitted.

Figure 8:
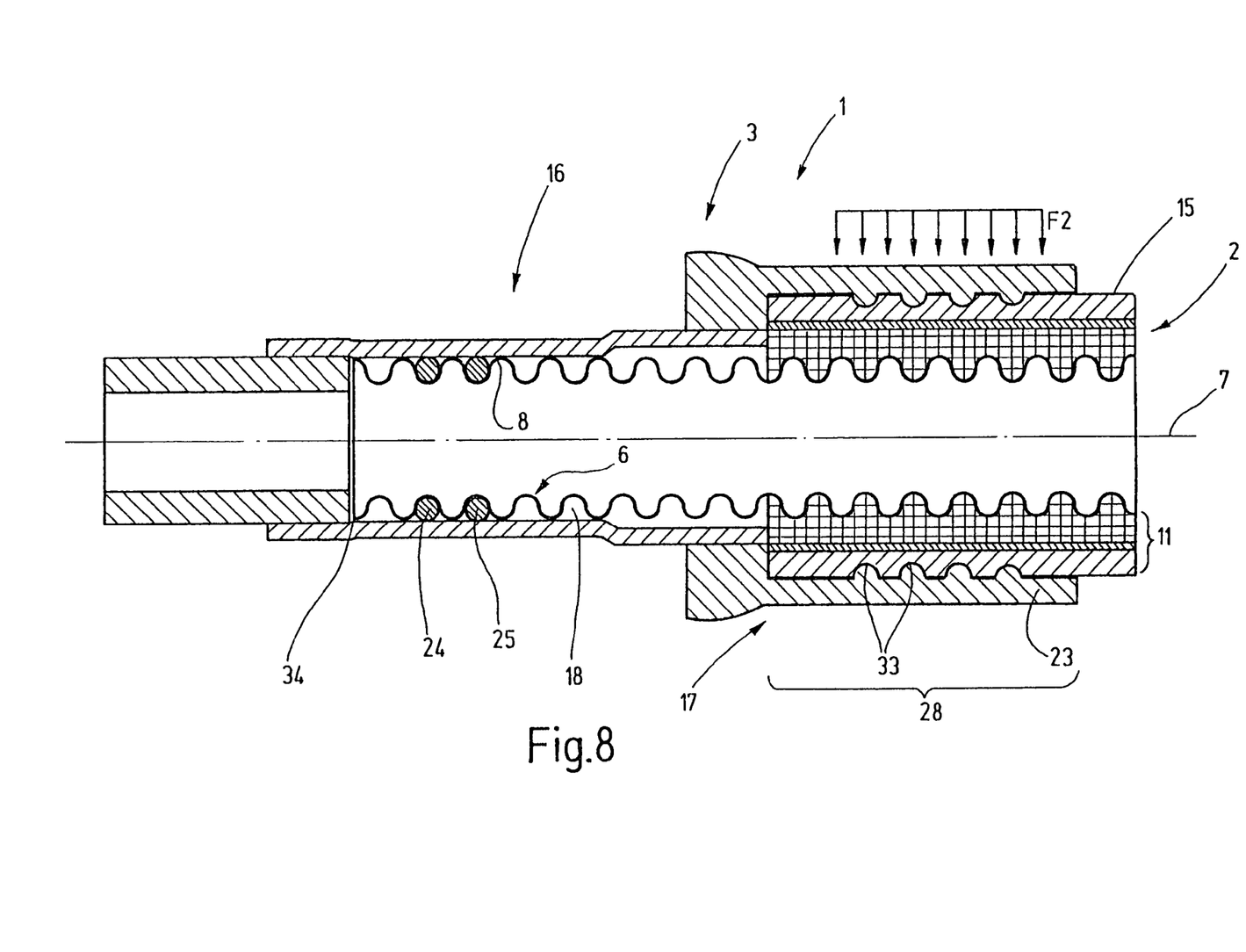

A variation of an embodiment of the holder 3 can be seen in FIG. 8. It essentially matches the previously described holder 3. Differences can consist in the following:

The wall of the element 17 of the holder in accordance with FIG. 8 is provided with profiling. As represented, the profiling can be formed by individual annular ribs, which are arranged concentrically with the axis 7. In its original state, i.e. if the element 17 has not yet been deformed, the interior diameter of the ribs 33 is so large that it exceeds the exterior diameter of the cover 15. Thus the section 28 of the sheathing can be easily pushed into the holder 3. In the course of pressing (radial compression of the element 17), the ribs 33 then penetrate the cover 15 of the flexible corrugated hose 2 and secure it in an interlocked manner. This embodiment has special importance if it is intended to apply the radially inward directed circumferential force for deforming the element 17 as a force application in a relatively broad annular area of the element 17, so that almost the entire wall 23 is deformed radially inward. In place of the ribs 33 it is also possible to provide a cut thread, which is cut into the cover 15 when the holder 3 is screwed together with the flexible corrugated hose 2.

For connecting flexible corrugated hoses, which are not provided with fittings, for transporting preferably gaseous media in connection with high-pressure applications, a holder 3 is provided, which receives an exposed end of the corrugated pipe 6 of the flexible corrugated hose 2 and is pressed together with it to form a metallic seal. The metallic seal is achieved by the surface pressure between the interior wall 18 of an element 16 of the holder and the ribs 8 of the corrugated pipe 6. Elastomeric seals 24, 25, as well as a soldering joint 34, if desired, can be provided as aids. However, in connection with a preferred embodiment the required sealing is already achieved by the strong pressure against each other of the metallic exterior of the corrugated pipe 6 and the metallic interior of the element 16. A further element 17 of the holder 3 fixes a section 28 of the sheathing 11 of the flexible corrugated hose 2 in the axial direction, as well as in respect to tilting movements, so that pivot movements of the flexible corrugated hose 2 do not lead to a relative movement between the corrugated pipe 6 and the holder 3, in particular the element 16. Thus, the sealed area remains unaffected, even in case of mechanical tensile or bending stresses of the flexible corrugated hose assembly 1.

The invention claimed is:

1. A flexible corrugated hose assembly for installations conveying pressure, the hose assembly comprising:
    a flexible corrugated hose including a corrugated pipe and a sheathing that surrounds the corrugated pipe with the exception of at least one end area, the corrugated pipe having ring-shaped ribs axially distanced from each other;
    a holder including a first pipe-shaped element having a passage that receives the end area of the corrugated pipe and a second pipe-shaped element with an opening that receives a section of the sheathing of the corrugated hose, wherein the passage is defined by an interior wall of the first pipe-shaped element and the opening is defined by a wall of the second pipe-shaped element; and
    a conducting means, which is fluid conductor connected in a fluid-tight manner with the first pipe-shaped element;
    wherein at least a portion of the first pipe-shaped element is deformed in a radially inward direction in such a way that its interior wall sealingly rests against at least one rib in the end area of the corrugated pipe,
    wherein at least a portion of the second pipe-shaped element is deformed in a radially inward direction in such a way that its wall is compressed against the sheathing of the corrugated hose in an interlocking manner.

2. The flexible corrugated hose assembly in accordance with claim 1, wherein the corrugated pipe is a metal pipe, the first element is made of metal, and a fluid-tight press fit is formed between the first element and the corrugated pipe.

3. The flexible corrugated hose assembly in accordance with claim 1, wherein at least a portion of the first pipe-shaped element is deformed in its radial direction in such a way that it sealingly rests with its interior wall against several ribs of the corrugated pipe, and a fluid-tight press fit is formed between the first element and the corrugated pipe.

4. The flexible corrugated hose assembly in accordance with claim 1, wherein the first element is plastically deformed.

5. The flexible corrugated hose assembly in accordance with claim 4, wherein the plastic deformation is directed radially inward in a ring-shaped area of the first element.

6. The flexible corrugated hose assembly in accordance with claim 1, wherein the first element is seated by means of a shrink fit on the corrugated pipe.

7. The flexible corrugated hose assembly in accordance with claim 1, wherein the interior wall of the first element and the rib of the corrugated pipe comprise a metallic seal.

8. The flexible corrugated hose assembly in accordance with claim 1, wherein the interior wall of the first element is welded together with the rib of the corrugated pipe.

9. The flexible corrugated hose assembly in accordance with claim 1, wherein the corrugated pipe is provided with at least one o-ring between two adjacent ribs in the end area of the corrugated pipe, the o-ring being in sealing contact with the interior wall of the first pipe-shaped element.

10. The flexible corrugated hose assembly in accordance with claim 1, wherein the conducting means are rigidly designed and project into the first tube-shaped element of the holder.

11. The flexible corrugated hose assembly in accordance with claim 10, wherein the conducting means is soldered together with the first element and the corrugated pipe.

12. The flexible corrugated hose assembly in accordance with claim 1, wherein the corrugated pipe is connected with the conducting means.

13. The flexible corrugated hose assembly in accordance with claim 1, wherein the first element and the second element are welded or soldered together.

14. The flexible corrugated hose assembly in accordance with claim 1, wherein the second element is embodied in one piece with the first element.

15. The flexible corrugated hose assembly in accordance with claim 1, wherein the second element has an interior profiling.

16. The flexible corrugated hose assembly in accordance with claim 1, wherein a hose is arranged inside the corrugated pipe.

17. The flexible corrugated hose assembly in accordance with claim 12, wherein the conducting means is soldered together with the first element and the corrugated pipe.

18. A flexible corrugated hose assembly for installations conveying pressure, the hose assembly comprising:
a flexible corrugated hose including a corrugated pipe and a sheathing that surrounds the corrugated pipe with the exception of at least one end area, the corrugated pipe having ring-shaped ribs axially spaced from each other;
at least one sealing element disposed between two adjacent ribs in the end area of the corrugated pipe;
a holder including a first pipe-shaped element and a second pipe-shaped extending axially from the first pipe-shaped element, the first pipe-shaped element having an interior wall that receives the end area of the corrugated pipe, the second pipe-shaped element having an interior wall that receives a section of the sheathing of the corrugated hose; and
a fluid conductor connected in a fluid-tight manner with the first pipe-shaped element,
wherein at least a portion of the first pipe-shaped element is deformed in a radially inward direction in such a way that its interior wall sealingly engages the sealing element disposed between adjacent ribs in the end of the corrugated pipe,
wherein at least a portion of the second pipe-shaped element is deformed in a radially inward direction in such a way that its interior wall is compressed against the sheathing of the corrugated hose in an interlocking manner.

19. The flexible corrugated hose assembly in accordance with claim 18, wherein the sealing element is an o-ring.

20. A method for connecting a flexible corrugated hose to other conducting means, the corrugated hose including a corrugated pipe and a sheathing that surrounds the corrugated pipe, the method comprising the following steps:
a. removing the sheathing of the flexible corrugated hose in an end area, thereby defining an exposed end area of the corrugated pipe,
b. cleaning the exposed end area of the corrugated pipe,
c. providing a holder with a first pipe-shaped element having a passage sized to receive the exposed end area of the corrugated pipe and a second pipe-shaped element with an opening sized to receive a section of the sheathing, wherein the passage is defined by an interior wall of the first pipe-shaped element and the opening is defined by a wall of the second pipe-shaped element,
c. inserting the corrugated hose into the holder until the exposed end area of the corrugated pipe is received in the first pipe-shaped element and a section of the sheathing of the corrugated hose is received in the second pipe-shaped element,
d. inserting the conducting means into the first pipe-shaped element of the holder,
e. connecting the conducting means with the first pipe-shaped element,
f. deforming at least a portion of the first pipe-shaped element radially inward until its interior wall sealingly rests against at least one rib in the end area of the corrugated pipe, and
g. deforming at least a portion of the second pipe-shaped element radially inward until its wall compresses against the sheathing of the corrugated hose in an interlocking manner.

* * * * *

UNITED STATES PATENT AND TRADEMARK OFFICE
CERTIFICATE OF CORRECTION

| | | |
|---|---|---|
| PATENT NO. | : 7,328,920 B2 | Page 1 of 1 |
| APPLICATION NO. | : 10/470906 | |
| DATED | : February 12, 2008 | |
| INVENTOR(S) | : Axel Schneider et al. | |

It is certified that error appears in the above-identified patent and that said Letters Patent is hereby corrected as shown below:

On the Title page of the patent, replace "(22) PCT Filed: April 14, 2002" with

--(22) PCT Filed: January 14, 2002--

Signed and Sealed this

First Day of July, 2008

JON W. DUDAS
*Director of the United States Patent and Trademark Office*